(12) United States Patent
Armstrong et al.

(10) Patent No.: US 7,139,855 B2
(45) Date of Patent: Nov. 21, 2006

(54) HIGH PERFORMANCE SYNCHRONIZATION OF RESOURCE ALLOCATION IN A LOGICALLY-PARTITIONED SYSTEM

(75) Inventors: William Joseph Armstrong, Rochester, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 10/422,426

(22) Filed: Apr. 24, 2003

(65) Prior Publication Data

US 2004/0215859 A1 Oct. 28, 2004

(51) Int. Cl.
*G06F 12/00* (2006.01)
(52) U.S. Cl. ..................... 710/200; 710/240
(58) Field of Classification Search .............. 710/8, 710/17–19, 36, 200; 709/223–226, 229, 709/215, 216; 718/104; 711/147, 152
See application file for complete search history.

(56) References Cited

U.S. PATENT DOCUMENTS

| | | | | |
|---|---|---|---|---|
| 5,659,786 A | * | 8/1997 | George et al. | 713/100 |
| 5,895,492 A | * | 4/1999 | Greenspan et al. | 711/147 |
| 6,105,098 A | * | 8/2000 | Ninose et al. | 710/200 |
| 6,279,046 B1 | | 8/2001 | Armstrong et al. | |
| 6,633,916 B1 | * | 10/2003 | Kauffman | 709/229 |
| 6,691,146 B1 | * | 2/2004 | Armstrong et al. | 718/100 |
| 6,865,688 B1 | * | 3/2005 | Dawkins et al. | 714/6 |

OTHER PUBLICATIONS

Definition of "cache memory" by SearStorage.com.*
William J. Armstrong, et al, U.S. Appl. No. 10/400,702 (ROC920030107US1), filed Mar. 27, 2003.

* cited by examiner

*Primary Examiner*—Khanh Dang
(74) *Attorney, Agent, or Firm*—Owen J. Gamon

(57) ABSTRACT

A method, apparatus, system, and signal-bearing medium that in an embodiment set a resource indicator to indicate that a processor is using a resource in a logically-partitioned electronic device, determine whether a current partition in the logically-partitioned electronic device owns the resource, and clear the resource indicator after the processor is done using the resource. When a partition gives up ownership of a resource, a resource ownership state is changed to indicate that the partition does not own a resource, and the partition waits to continue executing until other processors have cleared their respective resource indicators. In an embodiment, the resource indicator is in a cache line that is local to the processor, which allows resources to be dynamically allocated with improved performance.

14 Claims, 4 Drawing Sheets

HIGH PERFORMANCE SYNCHRONIZATION OF RESOURCE ALLOCATION IN A LOGICALLY-PARTITIONED SYSTEM

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

An embodiment of the invention generally relates to computers. In particular, an embodiment of the invention generally relates to the management of multiple logical partitions in a logically-partitioned computer.

BACKGROUND

Computer technology continues to advance at a rapid pace, with significant developments being made in both software and in the underlying hardware upon which the software executes. One significant advance in computer technology is the development of multi-processor computers, where multiple computer processors are interfaced with one another to permit multiple operations to be performed concurrently, thus improving the overall performance of such computers. Also, a number of multi-processor computer designs rely on logical partitioning to allocate computer resources to further enhance the performance of multiple concurrent tasks.

With logical partitioning, a single physical computer is permitted to operate essentially like multiple and independent virtual computers (referred to as logical partitions), with the various resources in the physical computer (e.g., processors, memory, and input/output devices) allocated among the various logical partitions. Each logical partition may execute a separate operating system, and from the perspective of users and of the software applications executing on the logical partition, operates as a fully independent computer.

A resource shared among the logical partitions, often referred to as a hypervisor or a partition manager, manages the logical partitions and facilitates the allocation of resources to different logical partitions. The system administrator (a human user or a component in the computer) can move resources from one partition to another in order to manage the workload across the various partitions. The movement of such resources is dynamic, i.e., it occurs without a reboot or re-IPL (Initial Program Load) of the impacted partitions. When a resource is moved from one partition (partition A) to another partition (partition B), the partition manager needs to ensure that partition A cannot access the resource after it has been removed from partition A. In order to accomplish this, the following sequences of operations are typically taken:

Partition A uses the resource via the following sequence:
  a) A processor in partition A invokes the partition manager.
  b) The partition manager verifies that partition A owns the resource.
  c) The partition manager allows the processor in partition A to use the resource under the same invocation as step a).

A resource is removed from partition A via the following sequence:
  1) The system administrator asks partition A to give up a specific resource.
  2) Partition A frees up the resource from an operating system perspective in partition A and invokes the partition manager on one of partition A's processors in order to notify the partition manager that partition A is giving up the resource. The partition manager, executing on a processor owned by the partition A, marks the resource as not in use, so that a subsequent attempt by partition A to use the resource fails.
  3) The processor that marks the resource as not available checks the partition manager's other data structures to ensure that partition A is not using the resource. If the data structures indicate that the resource is in use, the call to free the resource fails. Otherwise the resource is freed and made available for use by the other partitions.

A problem occurs with the above scenarios in that a race condition exists between them. To understand the race condition, consider the following example. When a processor P1 in partition A is between steps b) and c) attempting to obtain the use of the resource, another processor P2 also in the partition A is between steps 2) and 3) and frees the resource for the entire partition A. The processor P1 subsequently performs step c), causing the partition A to still be using the resource even though the partition manager has already given the resource to another partition B. If both the partition A and the partition B attempt to use the resource at the same time, errors or unpredictable results can occur. Thus, to solve this problem the partition manager needs to prevent this race condition, so that a malicious or errant partition cannot have access to a resource that it does not own.

One technique for addressing this problem is for the partition manager to use a global spin lock for both of the above sequences a-b-c and 1-2-3. A global spin lock is a simple but inefficient polling method where the process that is waiting for the lock to be unlocked does not accomplish any other work. This technique tends to have poor performance characteristics because of high contention for the cache line that contains the global spin lock.

Another technique for addressing this problem is for the partition manager to implement a spin lock on per-resource instance basis, that is, every resource has its own spin lock. While this technique yields better performance than does the global spin lock, it still can lead to cache line contention under performance sensitive calls to the partition manager for highly-used resources, and performance tends to be particular poor if a partition has a large number of processors.

Without a better way of allocating resources among logical partitions, the performance of logically-partitioned systems will continue to suffer.

SUMMARY

A method, apparatus, system, and signal-bearing medium are provided that in an embodiment set a resource indicator to indicate that a processor is using a resource in a logically-partitioned electronic device, determine whether a current partition in the logically-partitioned electronic device owns the resource, and clear the resource indicator after the processor is done using the resource. When a partition gives up ownership of a resource, a resource ownership state is changed to indicate that the partition does not own a resource and the partition waits until other processors have cleared their respective resource indicators before continuing executing. In this way, the performance of the use of the resource by a partition is optimized as compared to the removal of the resource from the partition. In an embodiment, the resource indicator is in a cache line that is local to the processor, which allows resources to be dynamically allocated with improved performance.

DETAILED DESCRIPTION

An embodiment of the invention recognizes that the removal of a resource from a partition is an infrequent operation as compared to the use of the resource, so the removal of a resource from a partition does not need to be a high-performance operation. Thus, an embodiment of the invention is optimized for the use of a resource by a partition rather than the removal of the resource from the partition. For operations that use a resource, embodiments of the invention uses synchronization that is based on a processor modifying a memory location or a spin lock that are local to each processor in the system. This technique can eliminate cache-line contention and can lead to a high-performance solution that lacks scaling issues as processors are added or removed from the system.

Figure 1:
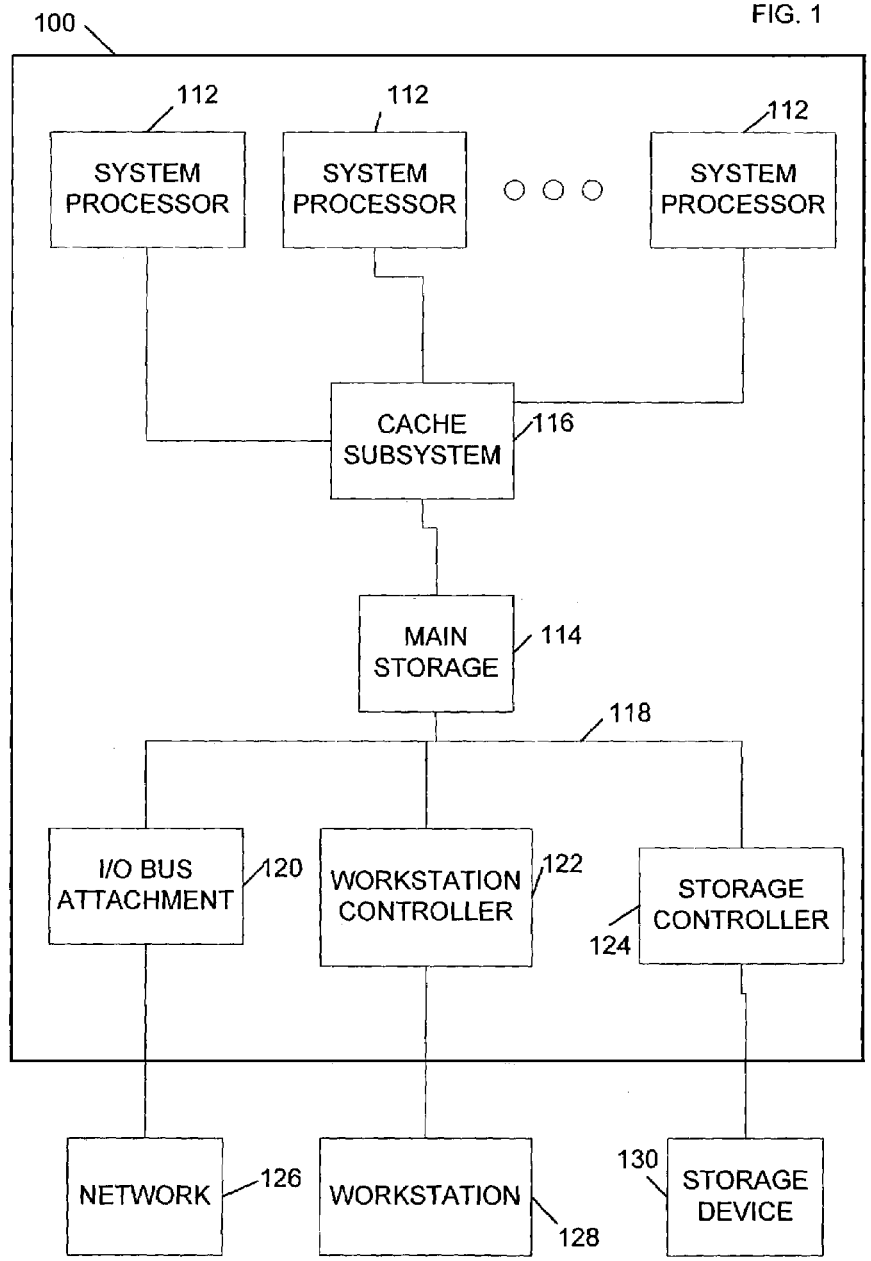
FIG. 1 depicts a block diagram of an example electronic device for implementing an embodiment of the invention.

Turning to the drawings, wherein like numbers denote like parts throughout the several views, FIG. 1 illustrates a data processing apparatus or electronic device 100 consistent with the invention. The electronic device 100 generically represents, for example, any of a number of multi-user computer systems such as a network server, a midrange computer, or a mainframe computer. But, embodiments of the invention may be implemented in other data processing apparatus, e.g., in stand-alone or single-user computer systems such as workstations, desktop computers, portable computers, pocket computers, tablet computers, or in other devices that have an embedded computing device, such as an embedded controller in a teleconferencing system, appliance, pager, telephone, automobile, PDA (Personal Digital Assistant), or any other appropriate device. One suitable implementation of an embodiment of the electronic device 100 is in a midrange computer such as the AS/400 series computer available from International Business Machines Corporation.

The electronic device 100 generally includes one or more system processors 112 coupled to a memory subsystem including main storage 114, e.g., an array of dynamic random access memory (DRAM), but in other embodiments any appropriate main storage may be used. Also illustrated as interposed between the processors 112 and the main storage 114 is a cache subsystem 116, typically including one or more levels of data, instruction and/or combination caches, with certain caches either serving individual processors or multiple processors. Furthermore, the main storage 114 is coupled to a number of types of external (I/O) devices via a system bus 118 and a plurality of interface devices, e.g., an input/output bus attachment interface 120, a workstation controller 122, and a storage controller 124, which respectively provide external access to one or more external networks 126, one or more workstations 128, and/or one or more storage devices 130.

The processors 112 represent central processing units of any type of architecture, such as a CISC (Complex Instruction Set Computing), RISC (Reduced Instruction Set Computing), VLIW (Very Long Instruction Word), or a hybrid architecture, although any appropriate processor may be used. In various embodiments, the processors 112 may be of all the same type or some or all may be of different types. The processors 112 execute instructions and typically include control units that organize data and program storage in memory and transfer data and other information between the various parts of the electronic device 100.

The system bus 118 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The network 126 may be any suitable network or combination of networks and may support any appropriate protocol suitable for communication of data and/or code to/from the electronic device 100. In various embodiments, the network 126 may represent a storage device or a combination of storage devices, either connected directly or indirectly to the electronic device 100. In an embodiment, the network 126 may support Infiniband. In another embodiment, the network 126 may support wireless communications. In another embodiment, the network 126 may support hard-wired communications, such as a telephone line or cable. In another embodiment, the network 126 may support the Ethernet IEEE (Institute of Electrical and Electronics Engineers) 802.3x specification. In another embodiment, the network 126 may be the Internet and may support IP (Internet Protocol). In another embodiment, the network 126 may be a local area network (LAN) or a wide area network (WAN). In another embodiment, the network 126 may be a hotspot service provider network. In another embodiment, the network 126 may be an intranet. In another embodiment, the network 126 may be a GPRS (General Packet Radio Service) network. In another embodiment, the network 126 may be any appropriate cellular data network or cell-based radio network technology. In another embodiment, the network 126 may be an IEEE 802.11B wireless network. In still another embodiment, the network 126 may be any suitable network or combination of networks. Although one network 126 is shown, in other embodiments any number of networks (of the same or different types) may be present, including zero.

The storage device 130 represents one or more mechanisms for storing data. For example, the storage device 130 may include read only memory (ROM), random access memory (RAM), magnetic disk storage media, optical storage media, flash memory devices, and/or other machine-readable media. In other embodiments, any appropriate type of storage device may be used. Although only one storage device 130 is shown, multiple storage devices and multiple types of storage devices may be present. Although the storage device 130 is shown to be connected to the storage controller 124, in other embodiments, the storage device 130 may be accessed via the network 126. Although the storage device 130 is shown to be external to the electronic device 100, in another embodiment, the storage device 130 may be internal to the electronic device 100.

The hardware and software depicted in FIG. 1 may vary for specific applications and may include more or fewer elements than those depicted and may be arranged differently than depicted. For example, other peripheral devices such as audio adapters, or chip programming devices, such as EPROM (Erasable Programmable Read-Only Memory) programming devices may be used in addition to or in place of the hardware already depicted.

Figure 2:
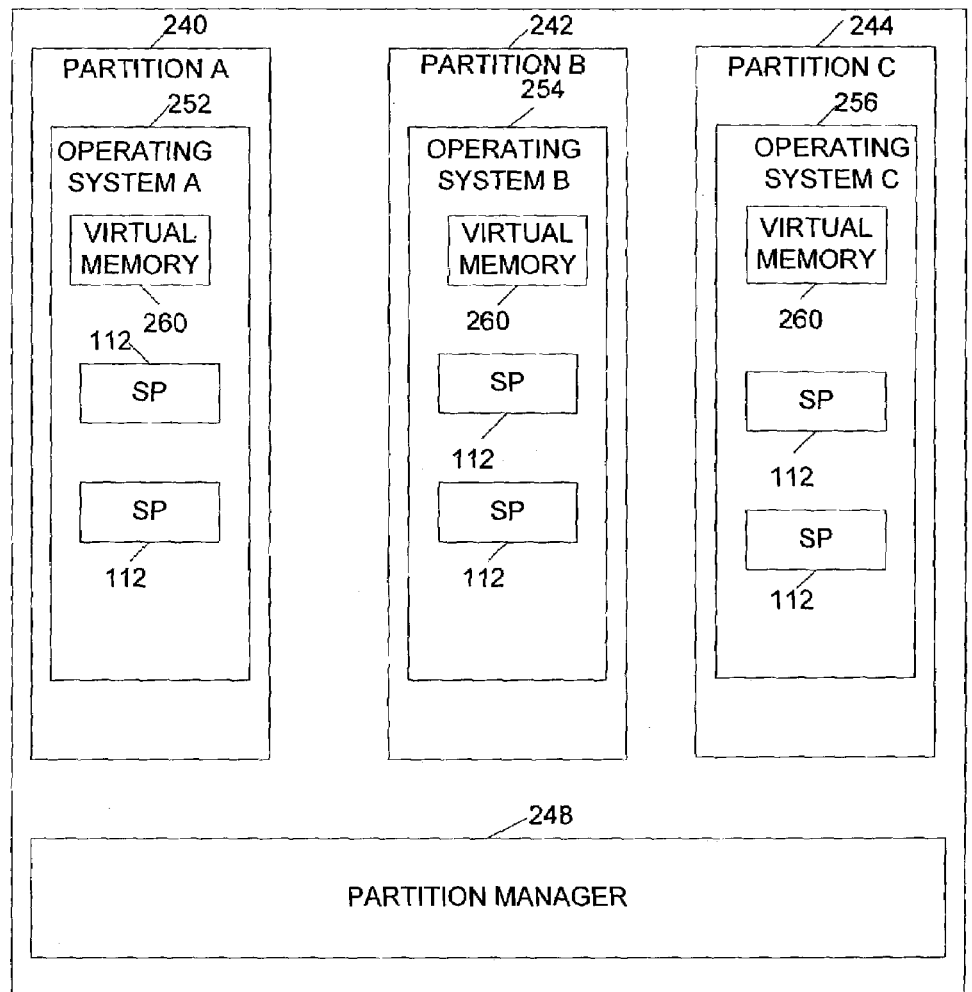
FIG. 2 depicts a block diagram of the primary hardware and software components and resources in the electronic device of FIG. 1, according to an embodiment of the invention.
Figure 2:
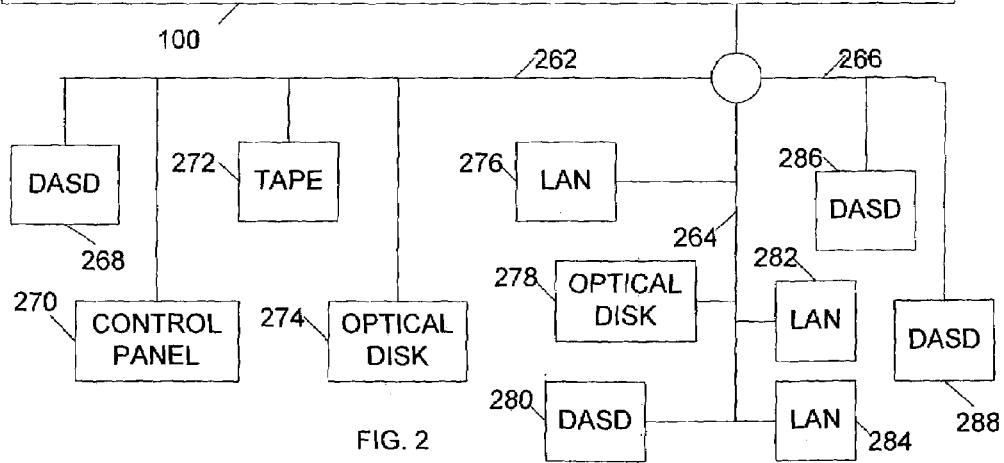

FIG. 2 illustrates in greater detail the primary software and hardware components and resources utilized in implementing a logically-partitioned computing environment on the electronic device 100, including a plurality of logical partitions 240, 242, and 244 managed by a partition manager 248, according to an embodiment of the invention. All or only a portion of the logical partitions 240, 242, and 244 and the partition manager 248 may at various times exist in the main storage 114, the cache subsystem 116, and/or the storage device 130 and in various embodiments may be transmitted and/or received across the network 126, as previously shown in FIG. 1.

Each logical partition 240, 242, and 244 utilizes an operating system (e.g., operating systems 252, 254 and 256 for logical partitions 240, 242 and 244, respectively), that controls the primary operations of the logical partition in the same manner as the operating system of a non-partitioned computer. For example, each operating system 252, 254, and 256 may be implemented using the OS/400 operating system available from International Business Machines Corporation, residing on top of a kernel, e.g., AS/400 system licensed internal code (SLIC).

Each logical partition 240, 242, and 244 executes in a separate, or independent, memory space, represented by virtual memory 260. Moreover, each logical partition 240, 242, and 244 is statically and/or dynamically allocated a portion of the available resources in the electronic device 100. For example, each logical partition is allocated one or more processors 112, as well as a portion of the available memory space for use in the virtual memory 260. In an embodiment, the logical partitions 240, 242, and 244 may share specific hardware resources such as processors, such that a given processor is utilized by more than one logical partition. In another embodiment, the hardware resources can be allocated to only one logical partition at a time. Although three logical partitions 240, 242, and 244 are shown in FIG. 2, other embodiments may support any number of logical partitions.

The partition manager 248 includes instructions capable of being executed on the processors 112 or statements capable of being interpreted by instructions executed on the processors 112 to carry out the functions as further described below with reference to FIGS. 3 and 4. The partition manager 248 manages the partitions 240, 242, and 244. The partition manager 248 further allocates resources between the partitions 240, 242, and 244.

Additional resources, e.g., mass storage, backup storage, user input, network connections, and the like, are typically allocated to one or more logical partitions by the partition manager 248. Resources can be allocated in a number of manners, e.g., on a bus-by-bus basis, or on a resource-by-resource basis, with multiple logical partitions sharing resources on the same bus. Some resources may even be allocated to multiple logical partitions at a time.

FIG. 2 illustrates, for example, three logical buses 262, 264 and 266, with a plurality of resources on bus 262, including a direct access storage device (DASD) 268, a control panel 270, a tape drive 272, and an optical disk drive 274, allocated to the logical partition 240. Bus 264, on the other hand, may have resources allocated on a resource-by-resource basis, e.g., with local area network (LAN) adaptor 276, optical disk drive 278, and DASD 280 allocated to the logical partition 242, and LAN adaptors 282 and 284 allocated to the secondary logical partition 244. The bus 266 may represent, for example, a bus allocated specifically to logical partition 244, such that all resources on the bus, e.g., the DASD's 286 and 288, are allocated to the same logical partition.

The illustration of specific resources in FIG. 2 is merely exemplary in nature, and any combination and arrangement of resources may be allocated to any logical partition in the alternative. Moreover, resources may be reallocated on a dynamic basis to service the needs of other logical partitions. Furthermore, resources may also be represented in terms of input/output processors (IOP's) used to interface the electronic device 100 with the specific hardware devices.

The various software components and resources illustrated in FIG. 2 and implementing the embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device, and that, when read and executed by one or more processors in the electronic device, cause that electronic device to perform the steps necessary to execute steps or elements embodying the various aspects of an embodiment of the invention. Moreover, while embodiments of the invention have and hereinafter will be described in the context of fully functioning electronic devices, the various embodiments of the invention are capable of being distributed as a program product in a variety of forms, and that the invention applies equally regardless of the particular type of signal-bearing medium used to actually carry out the distribution. Examples of signal-bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links, including wireless communication links.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

Figure 3:
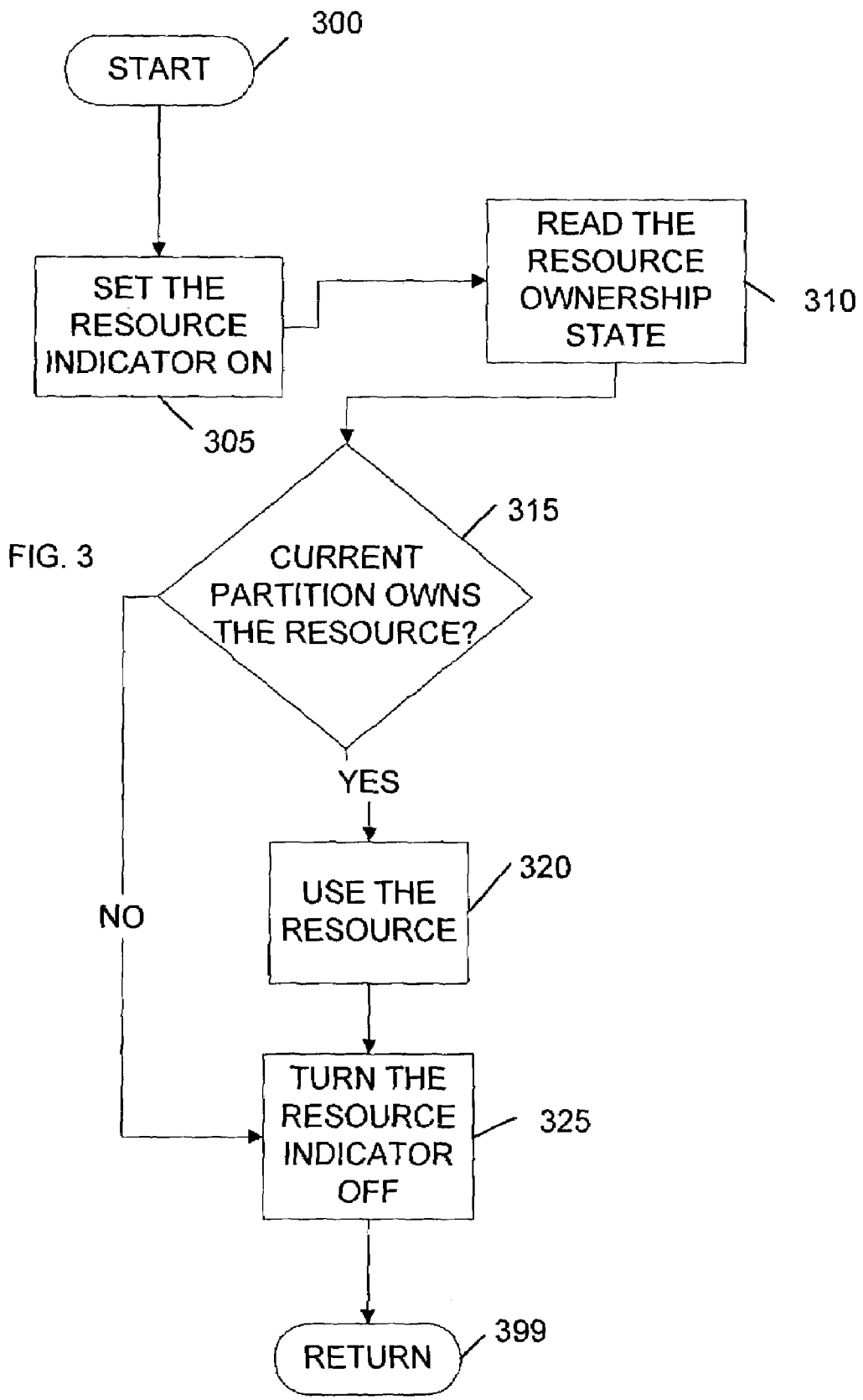
FIG. 3 depicts a flowchart of example processing for a partition manager when a partition uses a resource, according to an embodiment of the invention.

FIG. 3 depicts a flowchart of example processing for the partition manager 248 executing on a processor when a partition (such as partition 240, 242, or 244) uses a resource. When a processor 112 associated with a partition makes a call to the partition manager 248 to use a resource that could be dynamically allocated to another partition, the processor executes the processing as described in FIG. 3. One such example of a resource is a memory block. The memory block may be used in an entry in a page table of the partition, but in various embodiments the resource may be any of the resources previously described above with reference to FIGS. 1 and 2.

Control begins at block 300 via a hypervisor call. Control then continues to block 305 where the partition manager 248 sets the resource indicator on. The resource indicator is associated with the processor and indicates the start of a sequence to use a resource. In an embodiment, the resource indicator may be a memory location associated with the processor. In another embodiment, the resource indicator may be a spin lock associated with the processor.

Control then continues to block 310 where the partition manger 248 reads the resource ownership state. The resource ownership state is associated with the resource and indicates which partition owns the resource. In an embodiment, the resource ownership state may be implemented via values in a memory location or locations, but in other embodiments any appropriate implementation may be used.

Control then continues to block 315 where the partition manger 248 determines whether the current partition owns the resource based on the resource ownership state previously read at block 310.

If the determination at block 315 is true, then control continues to block 320 where the current partition uses the resource. Control then continues to block 325 where the partition manager in various embodiments clears the resource indicator, resets the resource indicator, turns the resource indicator off, or otherwise indicates that the processor is no longer using the resource. In an embodiment, the partition manger 248 may turn the resource indicator off by writing an off indication to a memory location. In another embodiment, the partition manager 248 may turn the resource indicator off by unlocking a spin lock. Control the continues to block 399 where the function returns an appropriate return code to the invoking partition.

If the determination at block 315 is false, then control continues from block 315 directly to block 325, as previously described above.

The following pseudo-code depicts the functions shown of FIG. 3 using a memory location associated with each processor for the resource indicator:

```
STD Ax     // Ax = 1 - Indicate start of sequence to use resource
SYNC_OP    // Order subsequent loads
LD Z       // Determine ownership of the resource
...        // Use the resource
SYNC_OP    // Order loads with respect to the next store
STD Ax     // Ax = 0 - Done using the resource associated with x
```

When a processor 112 in a partition—such as partition 240, 242, or 244—makes a call to the partition manager 248 to use a resource that could be dynamically allocated to another partition, the partition manager 248 executing on processor Px performs the operations described in the above pseudo-code sequence. STD Ax indicates that the partition manager 248 sets Ax=1, which indicates the start of the sequence to use the desired resource. Thus, in this example, the resource indicator is implemented by the memory location Ax and the value "1" signifies on. Each processor Px (processor 112) in the electronic device 100 has an associated memory location Ax. In an embodiment, the memory location Ax is in its own cache line local to the associated processor, which means there is no cache-line contention when using a resource. In an embodiment, the cache line may have other memory locations that are local to the processor Px.

SYNC_OP is a memory barrier that orders the subsequent load, meaning that it causes the STD Ax to be performed before the LD Z, which loads the resource ownership state from the memory location indicated by Z. The processor then determines whether its associated partition owns the resource based on Z and uses the resource if it does own the resource. After using the resource, the processor indicates the sequence is complete by executing STD Ax, which stores a value of 0 in the Ax memory location, although in other embodiments any appropriate value may be used.

The following alternative pseudo-code depicts the functions shown in FIG. 3 using a spin lock associated with each processor for the resource indicator:

```
Lock( ) Ax    // Lock Ax - Indicate start of sequence to use resource
// Lock sequence orders subsequent loads
LD Z          // Determine ownership of resource
...           // Use the resource
// Unlock sequence orders prior loads with respect to the unlock
unlock( ) Ax  // Done using the resource associated with processor x
```

Figure 4:
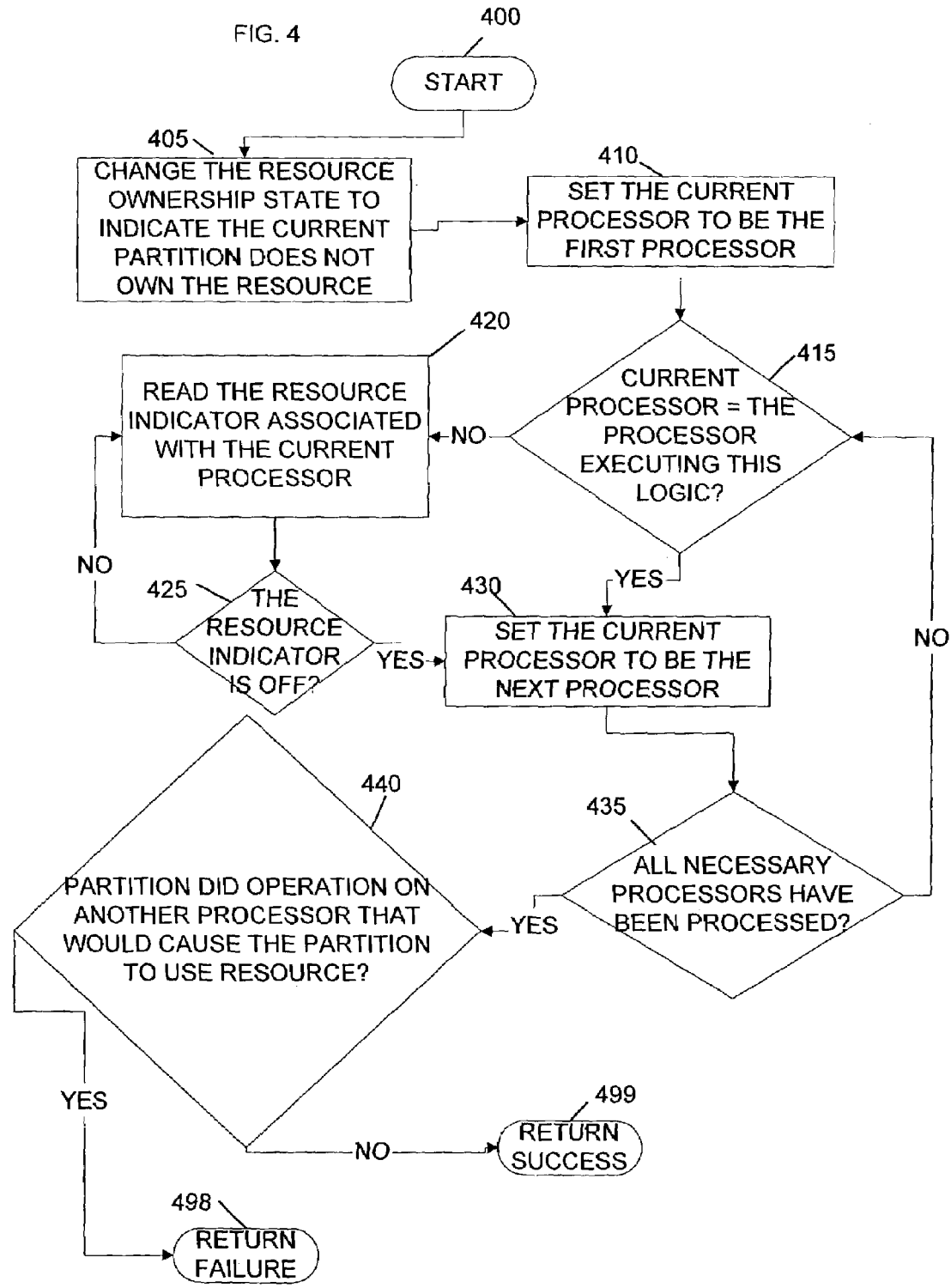
FIG. 4 depicts a flowchart of example processing for a partition manager when a partition gives up a resource, according to an embodiment of the invention.

FIG. 4 depicts a flowchart of example processing for the partition manager 248 executing on a processor when a partition (such as partition 240, 242, or 244) invokes the partition manager 248 to give up a resource. Control begins at block 400 via a hypervisor call. Control then continues to block 405 where the partition manager 248 changes the resource ownership state to indicate that the current partition does not own the resource.

Control then continues to block 410 where the partition manager 248 sets the current processor to be the first processor in the electronic device 100 (or in another embodiment the first processor in the current partition, depending on the type of resource). Control then continues to block 415 where the partition manager 248 determines whether the current processor is the processor that is executing the logic of FIG. 4.

If the determination at block 415 is true, then there is no need to check the resource indicator of the current processor because the current processor is executing the logic of FIG. 4 and is not using the resource, so control continues directly from block 415 to block 430, as previously described above.

If the determination at block 415 is false, then control continues to block 420 where the partition manager 248 reads the resource indicator associated with the current processor. Control then continues to block 425 where the partition manager 248 determines whether the resource indicator associated with the current processor is off. If the determination at block 425 is false, then control returns to block 420, as previously described above. Thus, the operations in bock 420 and 425 act as a loop that continues until the current processor turns its associated resource indicator off, indicating that the current processor is not using a resource that can be assigned dynamically between partitions.

If the determination at block 425 is true, then control then continues to block 430 where the partition manager 248 sets the current processor to be the next processor in the electronic device 100 (or in another embodiment the next processor in the partition). Control then continues to block 435 where the partition manager 248 determines whether all processors in the electronic device 100, which may be associated with multiple partitions, (or in another embodiment the processors are only associated with the current partition, depending on the type of resource) have been processed. If the determination at block 435 is false, then control returns to block 415 where the current processor is processed, as previously described above.

If the determination at block 435 is true, then processing for all of the processors (in the electronic device 100 or in the partition) is complete, so control continues to block 440 where the partition manager 248 checks its data structures to determine whether the partition has done an operation on another processor that would cause the partition to use the resource in a subsequent operation.

If the determination at block 440 is true, then control continues to block 498 where the function returns a failure indication to the partition that invoked the processing of FIG. 4.

If the determination at block 440 is false, then control continues to block 499 where the function returns a success indication to the partition that invoked the processing of FIG. 4, and the partition that invoked the processing of FIG. 4 is allowed to continue executing.

The following pseudo-code is an example implementation of the functions of FIG. 4 using a memory location associated with each processor as the resource indicator.

```
STD Z         // Change the state of the resource using a single store
SYNC_OP       // Order all subsequent loads
While(A1)     // Load P1's memory location until it is zero
While(A2)     // Load P2's memory location until it is zero
...
While(An)     // Load Pn's memory location until it is zero
// At this point, all target processors are done using the resource.
// A subsequent operation to use the resource on any processor
in the partition (as
// per FIG. 3) will load the new value of Z and fail the operation.
// Check whether the partition has a subsequent reference to the resource.
// Return success if no reference is found. Return failure otherwise.
```

The following pseudo-code is another example implementation of the functions of FIG. 4 using a spin lock associated with each processor as the resource indicator.

```
STD Z                   // Change the state of the resource
SYNC_OP                 // Order all subsequent loads
While A1 islocked( )    // Load processor P1's spin lock status until
                           it is held
While A2 islocked( )    // Load processor P2's spin lock status until
                           it is held
...
While An islocked( )    // Load processor Pn's spin lock status until
                           it is held
// At this point, all processors have seen the new state in Z
// Check whether the partition has a subsequent reference to the resource
```

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    setting a resource indicator to indicate that a processor is using a resource in a logically-partitioned electronic device, wherein the setting the resource indicator comprises setting a memory location in a cache line local to the processor;
    determining whether a current partition in the logically-partitioned electronic device owns the resource;
    clearing the resource indicator after the processor is done using the resource; and
    waiting to continue execution of the current partition after the clearing until a plurality of processors have turned their respective resource indicators off, wherein the respective resource indicators of the plurality of processors indicate whether each of the plurality of processors is using the resource.

2. The method of claim 1, further comprising:
    changing a resource ownership state to indicate the current partition does not own the resource.

3. The method of claim 1, wherein the plurality of processors are associated with the current partition.

4. The method of claim 1, wherein the plurality of processors are associated with a plurality of partitions.

5. The method of claim 1, wherein the resource is dynamically allocated.

6. The method of claim 1, wherein the resource indicator is modified only by the processor.

7. An apparatus comprising:
    means for setting a resource indicator to indicate that a processor is using a resource in a logically-partitioned electronic device, wherein the means for setting the resource indicator further comprises setting a memory location in a cache line local to the processor;
    means for determining whether a current partition in the logically-partitioned electronic device owns the resource, wherein the means for determining is responsive to the means for setting;
    means for clearing the resource indicator after the processor is done using the resource, wherein the means for clearing is responsive to the means for setting; and
    means for changing a resource ownership state to indicate the current partition does not own the resource, wherein the means for changing is responsive to the means for clearing; and
    means for waiting after the means for changing the ownership state until a plurality of processors have turned their respective resource indicators off, wherein the means for waiting is responsive to the means for changing the ownership state, wherein the respective resource indicators of the plurality of processors indicate whether each of the plurality of processors is using the resource.

8. The apparatus of claim 7, wherein the means for setting the resource indicator comprises means for setting a memory location that is modified only by the processor.

9. The apparatus of claim 7, wherein the plurality of processors are associated with the current partition.

10. The apparatus of claim 7, wherein the plurality of processors are associated with a plurality of partitions.

11. A storage device encoded with instructions, wherein the instructions when executed comprise:
  changing a resource ownership state to indicate that a partition does not own a resource;
  reading a plurality of resource indicators associated with a respective plurality of processors, wherein the plurality of resource indicators are in a plurality of respective cache lines local to the plurality of respective processors; and
  waiting until all the plurality of resource indicators are clear before allowing the partition to continue executing, wherein the respective resource indicators of the plurality of processors indicate whether each of the plurality of processors is using the resource.

12. The storage device of claim 11, wherein the plurality of processors are associated with the partition.

13. The storage device of claim 11, wherein the plurality of processors are associated with a plurality of logical partitions in an electronic device.

14. An electronic device comprising:
  a plurality of processors allocated among a plurality of logical partitions of the electronic device; and
  a storage device coupled to the plurality of processors, wherein the storage device is encoded with instructions, wherein the instructions when executed on at least one of the plurality of processors comprise:
  receiving a request to free a resource owned by one of the plurality of logical partitions,
  changing a resource ownership state to indicate that the one of the plurality of logical partitions does not own the resource,
  reading a plurality of resource indicators associated with the respective plurality of processors, wherein the plurality of resource indicators comprise a plurality of memory locations associated with the respective plurality of processors, and wherein the plurality of memory locations are local to the respective plurality of processors, and
  waiting until the plurality of resource indicators are clear before allowing the one of the plurality of logical partitions to continue executing, wherein the respective resource indicators of the plurality of processors indicate whether each of the plurality of processors is using the resource.

* * * * *